Jan. 1, 1935. W. G. MILNE 1,986,642
GROUND ROD CLIP
Filed March 2, 1932 2 Sheets-Sheet 1
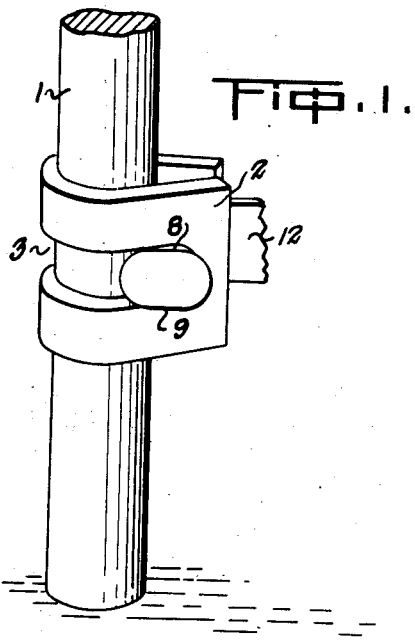
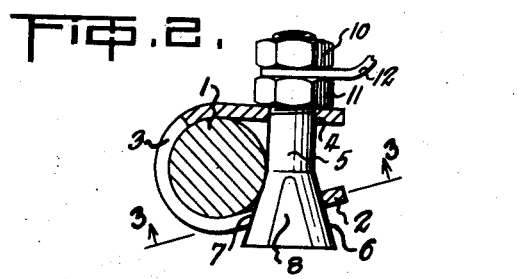
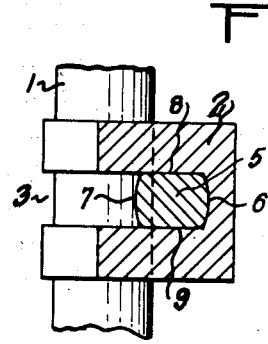
Inventor
Winford G. Milne Jan. 1, 1935.   W. G. MILNE   1,986,642
GROUND ROD CLIP
Filed March 2, 1932   2 Sheets-Sheet 2

Inventor
Winford G. Milne

UNITED STATES PATENT OFFICE 1,986,642

GROUND ROD CLIP

Winford Gladstone Milne, Hamilton, Ontario, Canada, assignor to N. Slater Company Limited, Hamilton, Ontario, Canada, a company of Canada Application March 2, 1932, Serial No. 596,381

6 Claims. (Cl. 173—273)

My invention relates to ground rod clips and is directed towards the improvement of the type of clip used for forming a connection between a lead and a ground rod or in fact any similar form of connection, electrical or otherwise.

The object of my invention is to devise such a clip which may be applied to any type of rod and which will have a close metal to metal contact with the rod to prevent the entrance of moisture and consequent corrosion, and a further object of my invention is to utilize a flare headed bolt passing through the clip and by the provision of the flare head making a close contact with the rod.

Another object of my invention is to make my clip of simple, cheap and serviceable form, which may be readily and securely applied, and it consists of the arrangement and construction of parts as hereinafter more particularly set forth.

Fig. 1 is a perspective view of a ground rod showing my clip applied thereto.

Fig. 2 is a plan section through the ground rod and clip and showing the connecting bolt in full.

Fig. 3 is a sectional view on line 3—3 of Fig. 2.

In the drawings like characters of reference indicate corresponding parts in each figure.

Figure 4:
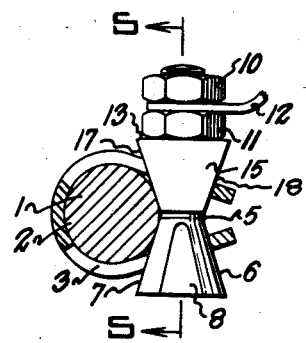
Fig. 4 is a similar view to Fig. 2, showing a wedge shaped member positioned on the bolt so that the strap is drawn by a wedge action from both ends.

1 indicates a ground rod. 2 is a strap of metal forming the body of the clip which is provided with a slot 3 extending from a point in proximity to one end towards substantially the middle of the length of the strap. The strap is bent into U form, the opposite end from the slot 3 being either provided with an orifice 4, or if desired, the slot 3 may be extended so as to also form this orifice. 5 is a bolt, the head being of flare form and inclined outwardly as indicated at 6 and 7, the sides of the head being flat as indicated at 8 and 9 so as to fit between the sides of the slot 3.

The inclined bolt head portion 6 engages the front end of the slot 3 and the inclined portion 7 engages the opposing peripheral portion of the rod 1 when inserted in the clip as clearly indicated in Fig. 2. The opposite end of the bolt 5 extends through the orifice 4 or the opposite end of the slot 3, if it is provided in the extended form, and is furnished with a pair of nuts 10 and 11. The lead 12 has the usual bolt receiving orifice therein and is connected to the bolt 5 between the nuts 10 and 11. In this manner the lead can be removed by the removal of the nut 10, without disturbing the clip upon its rod.

The strap 2, when bent into U form, is passed laterally on to the rod 1, such rod fitting into the base of the U. The bolt 5 is then inserted, the lead 12 positioned thereon and the nut 11 applied, so that when such nut is tightened the inclined portion 7 of the bolt is drawn into engagement with the periphery of the rod 1 and the inclined portion 6 against the end wall of the slot 3, whereby, as the bolt is drawn tight and the arms of the U strap 2 drawn together, the base of the U is drawn tightly around the rod, such rod being forced thereagainst by the inclined portion of the flaring head which wedges the rod into the base of the U. The coaction between the inclined portion 6 of the head bearing against the end of the slot 3 causes the sharp edge of such slot to bite slightly into the metal of the bolt.

It will thus be seen that a very tight contact is formed between the strap 2 and the rod 1 whereby corrosion due to moisture is prevented from gathering between the contacting surfaces. By extending the slot 3 around the base of the U strap the metal at this point is weakened so as to readily take an even bend.

Figure 5:
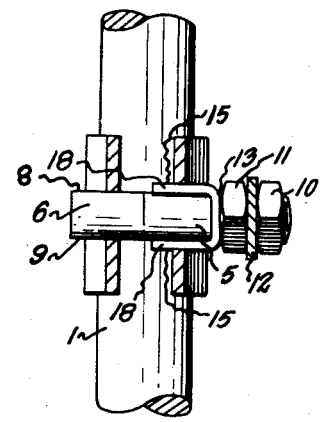
Fig. 5 is a side elevational view of the rod upon which the clip illustrated in Fig. 4 is positioned, the clip being shown in section through the line 5—5 Fig. 4.
Figure 7:
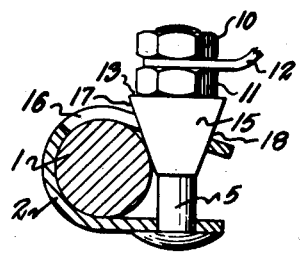
Fig. 7 is also a similar view to Fig. 2 showing the use of the wedge shaped member upon a standard type of bolt wherein the strap is drawn by the wedge action at the opposite end to that illustrated in Fig. 2.
Figure 8:
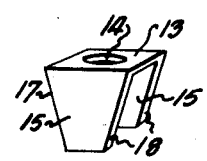
Fig. 8 is a perspective view of the wedge member.

The form of clip illustrated in Figs. 4, 5 and 7 incorporates the use of a wedge member such as illustrated in Fig. 8. This member comprises a flat nut engaging portion 13 having a bolt receiving orifice 14 therein, and furnished upon two opposite sides with a pair of wedge shaped members 15 which are preferably integral with the member 13 and bent substantially at right angles thereto. The wedge shaped members 15 are adapted to lie along the bolt passing through the orifice 14 as illustrated in Fig. 5.

Figure 6:
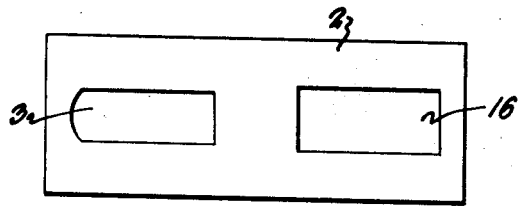
Fig. 6 is a plan view of the strap used in the form of clip illustrated in Figs. 4 and 5, such strap being shown in flat form.

In this type of clip the strap 2 as well as being formed with the slot 3 also is provided with a second slot 16 for the reception of the wedge shaped member. The slot 16 may be a continuation of the slot 3 or formed substantially as illustrated in Fig. 6. The clip assembly is positioned upon the rod in the same manner as hereinafter described with the exception that the wedge member is positioned upon the bolt and extends through the slot 16 wherein the tightening of the nut 11 will cause the edges 17 and 18 of the wedge member to have the same action in relation to the rod and the strap as the inclined portions 6 and 7 on the bolt head.

It will be seen upon reference to Fig. 5 that this form of clip is also capable of use upon rods of various diameters, for in the case of small rods wherein the nut 11 is carried down upon the bolt a considerable distance so that the wedge shaped member approaches the bolt head, that the wedge portions 15 will, if necessary, pass on to the flats 8 and 9 of the bolt head.

Fig. 7 illustrates the wedge member used in conjunction with a standard headed bolt so that the portions 15 of the wedge shaped member furnish the only wedging or drawing action of the strap around the rod.

While my clip is primarily designed so that it can be positioned upon a rod, the exposed end of which may be burred over, or connected to some other member, it will be readily seen that in cases where it is practical to do so, the clip may be slipped over the exposed free end of a rod without being taken apart and assembled around the rod as hereinbefore described.

Although I have illustrated and described the body of the clip as formed by a metal strap 2, it is to be understood that I can provide any other form of member instead of the strap, as for example an endless wire loop doubled around the rod, without departing from the spirit of my invention set forth in the appended claims.

What I claim as my invention is:

1. A rod clip for attachment to a conductor lead comprising a distortable rod receiving strap of substantially semi-circular form and having its ends free and projecting tangentially from the semi-circle, a strap bending bolt extending through orifices in the tangential strap portions, a member of substantially keystone form carried by the bolt and contained within one of the orifices whereby one oblique side of the member bears against the rod and the other oblique side of the member bears against an edge of the orifice, and a conductor lead formed with an orifice and through which the bolt also extends.

2. A rod clip for attachment to a conductor lead of the character described comprising an open ended bendable loop fitting partly around a rod and having a longitudinal slot therein, a bolt extending through the slot and connecting the free ends of the loop, a member of substantially keystone form carried by the bolt and contained within the slot whereby one oblique side of the member bears against the rod and the other oblique side of the member bears against an end of the slot, and a nut threaded upon the bolt to draw the ends of the loop together and the keystone member relatively to the face of the rod, and a conductor lead formed with an orifice and through which the bolt also extends.

3. A rod clip for attachment to a conductor lead comprising a distortable strap of substantially semi-circular form adapted to be partially wrapped around a rod and having its ends free and projecting substantially tangentially and parallel from the semi-circle, a strap bending bolt initially extending substantially at right angles to the tangential strap ends and through orifices therein, wedge means forming the head of the bolt and adapted to engage one edge of the orifice in one strap end and the face of the rod, a nut carried by the bolt and engaging the outer face of the other strap end whereby the tightening of the nut first bends the bolt head engaged strap end out of position at right angles to the bolt and then wedges the head between the edge of the orifice and the face of the rod, and a conductor lead formed with an orifice and through which the bolt also extends.

4. A rod clip for attachment to a conductor lead of the character described comprising a distortable rod receiving strap of substantially semi-circular form and having its free ends projecting tangentially from the semi-circle, a bolt extending through a longitudinal slot in the strap and connecting the free ends of the loop, a head on the bolt of substantially keystone form contained within the slot and positioned between an end of the slot and the face of the rod, a wedge member of U-shaped cross section slidably carried upon the bolt and extending through a slot in the loop and positioned between an end of the slot and the face of the rod, a nut threaded upon the bolt to draw the ends of the loop together and wedge the bolt head and wedge member between the ends of their slots and the rod, and a conductor lead formed with an orifice and through which the bolt also extends.

5. A rod clip for attachment to a conductor lead comprising a distortable rod receiving strap of substantially semi-circular form and having its ends free and projecting tangentially from the semi-circle, a strap bending bolt extending through orifices in the tangential strap portions, a member of substantially keystone shape forming the head of the bolt and contained within one of the orifices whereby one oblique side bears against the rod and the other oblique side bears against an edge of the orifice, and a conductor lead formed with an orifice and through which the bolt also extends.

6. A rod clip for attachment to a conductor lead comprising a distortable strap of substantially semi-circular form adapted to be partially wrapped around a rod and having its ends free and projecting substantially tangentially and parallel from the semi-circle, a strap bending bolt initially extending substantially at right angles to the tangential strap ends and through orifices therein, a substantially keystone shaped head on the bolt and contained within one of the orifices in one strap end whereby one oblique side bears against the rod and the other oblique side bears against an edge of the orifice, a nut carried by the bolt and engaging the outer face of the other strap end whereby the tightening of the nut first bends the bolt head engaged strap end out of position at right angles to the bolt and then wedges the head between the edge of the orifice and the face of the rod.

WINFORD GLADSTONE MILNE.